United States Patent
Lai (10) Patent No.: US 6,672,007 B1
(45) Date of Patent: Jan. 6, 2004

(54) ISOLATING PLATE FOR A FLOWERPOT FOR STORING WATER AND SUPPLYING WATER

(76) Inventor: Yang Song Lai, No. 32, Fu-Yi Load, Tai-peng City, Taichung Hsien (TW)

( * ) Notice: Subject to any disclaimer, the term of this patent is extended or adjusted under 35 U.S.C. 154(b) by 0 days.

(21) Appl. No.: 10/270,634

(22) Filed: Oct. 16, 2002

(51) Int. Cl.⁷ ............................................. A01G 25/00
(52) U.S. Cl. ............................................. 47/79; 47/80
(58) Field of Search ............................. 47/79, 80, 65.5

(56) References Cited

U.S. PATENT DOCUMENTS

| | | | | |
|---|---|---|---|---|
| 4,083,147 A | * | 4/1978 | Garrick | 47/80 |
| 4,133,141 A | * | 1/1979 | Lee | 47/79 |
| 4,216,623 A | * | 8/1980 | Silver | 47/80 |
| 6,219,969 B1 | * | 4/2001 | Dion | 47/79 |
| 6,276,090 B1 | * | 8/2001 | Lai | 47/79 |
| 6,363,658 B1 | * | 4/2002 | Lai | 47/79 |
| 6,505,440 B1 | * | 1/2003 | Lai | 47/79 |

FOREIGN PATENT DOCUMENTS

JP         349827    *   4/1992

* cited by examiner

Primary Examiner—Charles T. Jordan
Assistant Examiner—T. Nguyen (57) ABSTRACT

An isolating plate for a flowerpot for storing water and suplying water with predetermined amount comprises an isolating plate, a groove seat having a spacer, a water control means, a water control chamber, a water supply groove, and an auxiliary water storage chamber. In one application, the auxiliary water storage chamber is an auxiliary water storage basin. By the isolating plate; the isolating plate and the auxiliary water storage basin are placed in the flowerpot. In another application, the auxiliary water storage chamber is formed by a space between the isolating plate and a bottom of the flowerpot. Thereby, by the structure of the isolating plate, the water in the flowerpot is controllable.

6 Claims, 8 Drawing Sheets

ISOLATING PLATE FOR A FLOWERPOT FOR STORING WATER AND SUPPLYING WATER

FIELD OF THE INVENTION

The present invention relates to devices used in flowerpots, and particularly to an isolating plate for a flowerpot for storing; water and supplying water.

BACKGROUND OF THE INVENTION

In the prior art, the bottom of a flowerpot is formed with vent hole. However, other part away from the vent hole has poor ventilating effect. Thereby, an isolating plate is installed in the flowerpot so that a gap is left between the isolating plate and the bottom of the flowerpot. The isolating plate has a plurality of vent holes for ventilation. However, the prior art isolating plate has only ventilation effect, but no function of water storage. This is inconvenient in current busy society.

In another design a flowerpot has a function of water storage and a water absorption material (such as cotton piece, or sponge) is used in the water and the space between the water and planting earth so as to wet the earth. However, this prior art design has the following defects:

(1) If the water absorption material erodes, the water storage space will not store water and thus water can not be transferred to the earth.
(2) Rainy water flowing into the flowerpot can not be drained out of the flowerpot so that the roots of plants in the flowerpot will erode.
(3) The installation of water storage material will cause that the ventilation of air in the roots of the plants become worse so that the lifetimes of the plants are shortened.

SUMMARY OF THE INVENTION

Accordingly, the primary object of the present invention is to provide an isolating plate for a flowerpot for storing water and supplying water with predetermined amount, wherein the isolating plate comprises an isolating plate, a groove seat having a spacer, a water control means, a water control chamber, a Water supply groove, and an auxiliary water storage chamber.

In one application, the auxiliary water storage chamber is an auxiliary water storage basin. By the isolating plate; the isolating plate and the auxiliary water storage basin are placed in another flowerpot. A bottom of the flowerpot has vent holes and thus can not store water, but by the isolating plate and the auxiliary water storage basin, water is stored in the auxiliary water storage basin. Amount of water is controlled according to absorption of roots of plants in the flowerpot. Thus, a preferred ventilation is provided.

In another application, the auxiliary water storage chamber is formed by a space between the isolating plate and a bottom of the flowerpot. The flowerpot has a ventilating tube protruded from a bottom of the flowerpot, the isolating plate is placed in the flowerpot, a space with the flowerpot and below an upper end of the ventilating tube is formed is a water storage space. By the structure of the isolating plate, the water in the flowerpot is controllable.

The various objects and advantages of the present invention will be more readily understood from the following detailed description when read in con unction with the appended drawing.

BRIEF DESCRIPTION OF THE DRAWINGS

FIG. 2 is assembled views, where FIG. 2A shows that water is full and FIG. 2B shows that water is supplemented in lower level according to the present invention.

FIG. 3B is a whole cross sectional view of the present invention.

FIG. 4 shows that the present invention is used to a flowerpot having a protruding ventilating tube, where FIG. 4A is a partial cross sectional view of the present invention and FIG. 4B is a whole cross sectional view of the present invention.

FIG. 7 shows one embodiment that the isolating plate is integrally formed with an auxiliary water storage basin, wherein FIG. 7A is a perspective view and FIG. 7B is a cross sectional view.

DETAILED DESCRIPTION OF THE PREFERRED EMBODIMENTS

Figure 1:
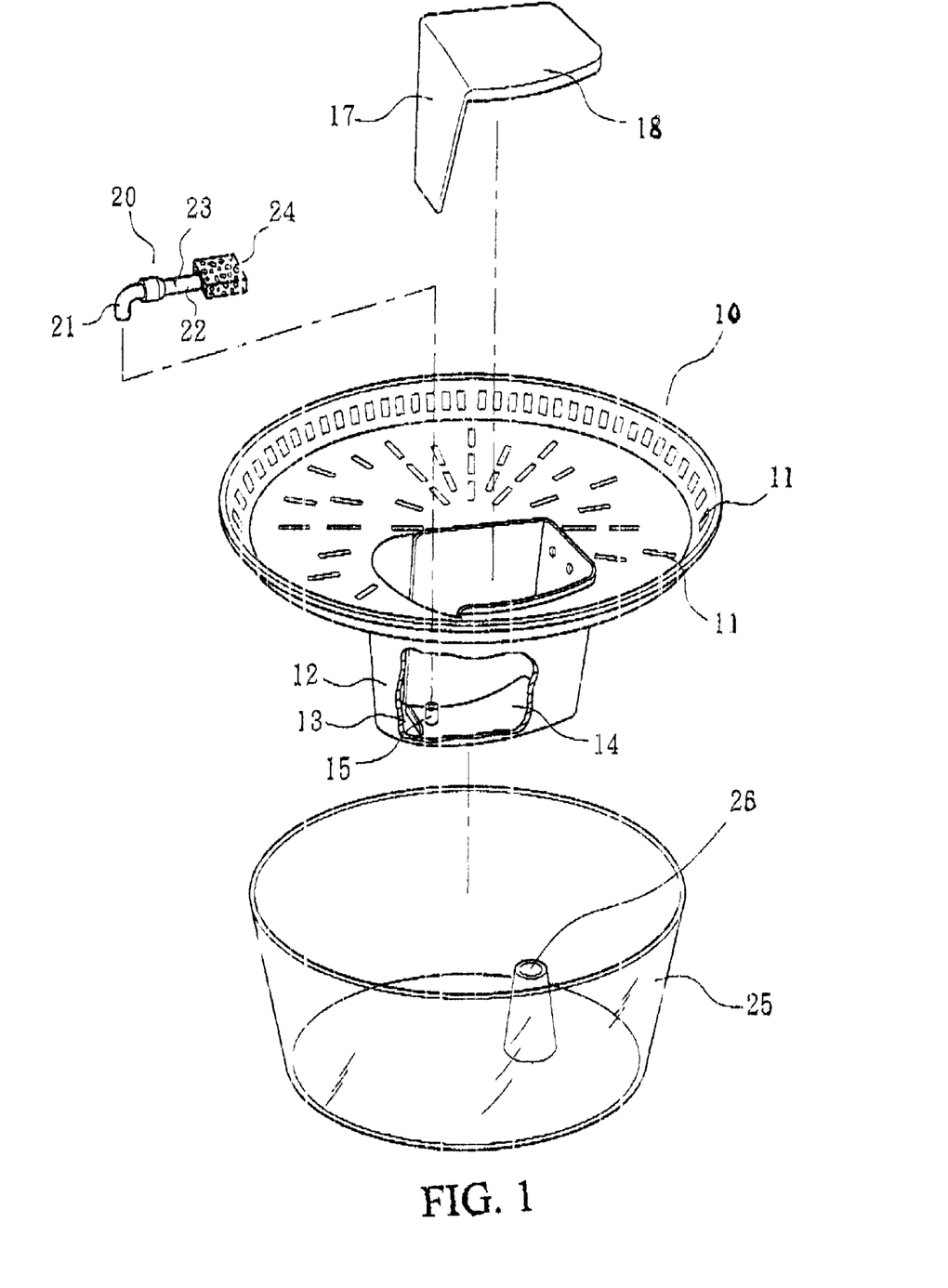
FIG. 1 is a partial exploded perspective view of one preferred embodiment of the present invention.
Figure 2:
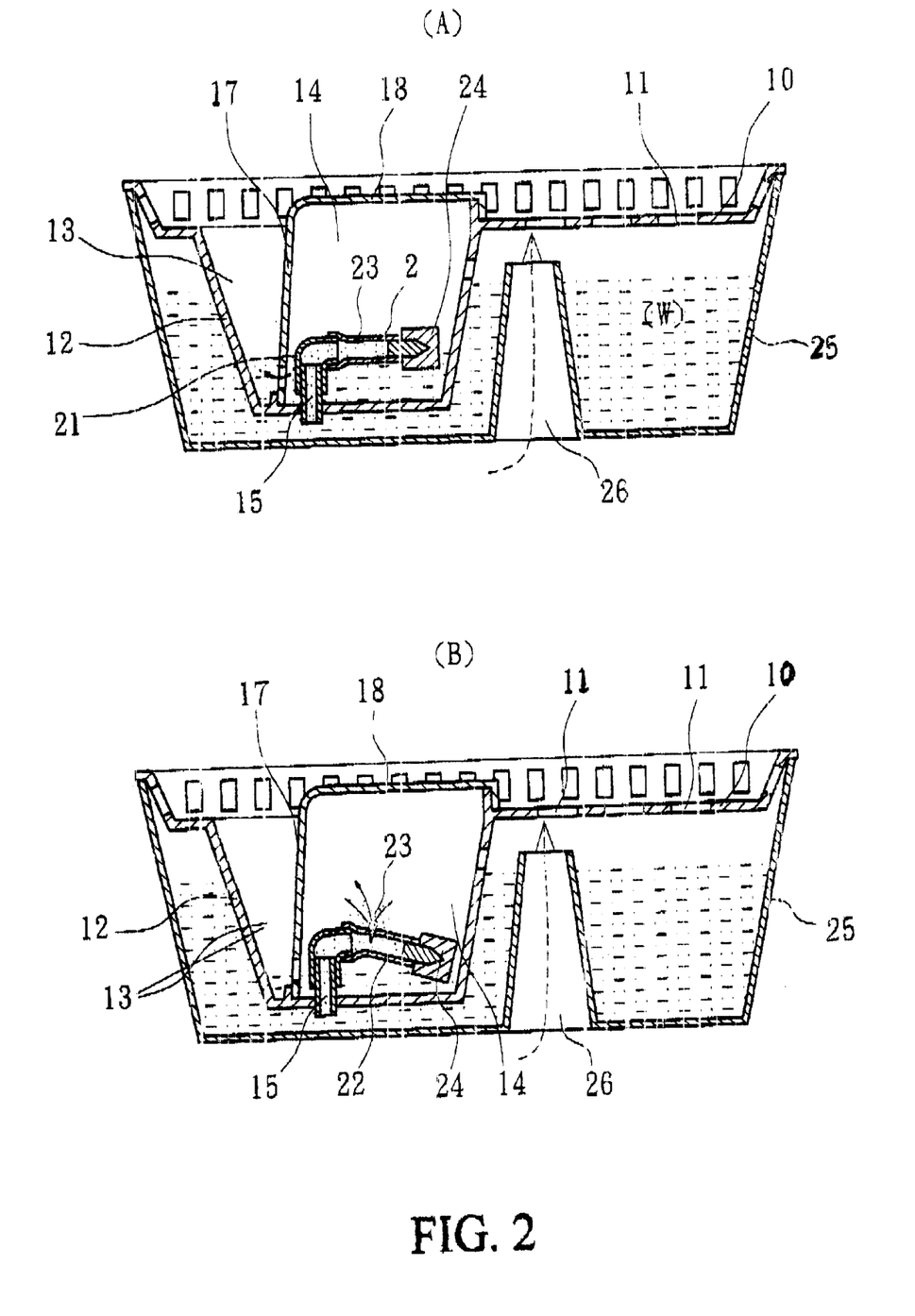

Referring to FIGS. 1 and 2, the present invention will be described herein. The present invention includes an isolating plate 10 with vent holes 11, an auxiliary water storage basin 25, and a water control chamber.

The isolating plate 10 has a downward groove seat 12. The groove seat 12 is installed with a spacer 17 having a cover 18. The spacer 17 spaces the groove seat 12 into a water control chamber 14 and a water supply groove 13. The spacer 17 is not tightly sealed so that water in the water control chamber 14 an drain into the water supply groove 13. The cover 18 above the spacer 17 seals the opening at the upper end of the water control chamber 14 of the groove seat 12. Thereby, the planting earth will not drop into the water control chamber 14. The opening at the upper end of the water supply groove 13 is not sealed so that the planting earth fills into the groove 13 to absorb absorb in the groove 13. Moreover, a lower end of the water control chamber 14 has a penetrating water hole 15. The lower end of the water hole 15 is communicated to a water storage space W (auxiliary water storage basin 25). An upper end of the water hole 15 is assembled with a water control means 20 so that water in the water storage space flows into the water control chamber 14. Moreover, the water level is controlled in a proper value by the water control means 20 (amount of water is not too much) so that the water in the water supply groove 13 is not too much.

An auxiliary water storage basin 25 has a water storage space W. A ventilating tube 26 is installed at a place not to communicate with the groove seat 12 of the isolating plate 10. The upper end of the ventilating tube 26 is lower than the bottom of the isolating plate 10 and has a gap to the bottom of the isolating plate 10 so that water will not contact the isolating plate 10. Thereby, air flows into the space below the bottom of the isolating plate 10 through the ventilating tube 26.

A water control means 20 is installed with a soft rubber tube 22. A distal end of the soft tube 22 has a floating block 24. A slit 23 is formed on the soft rubber tube 22. A front end of the soft rubber tube 22 has a joint. Thereby, when the water control chamber 14 is in high level. The floating block 24 will rise so that slit 23 is compressed and thus is sealed. Thereby, water is stopped. When water in the water control chamber 14 is in lower level, the floating block 24 descends, and thus the slit 23 opens so that water flows into the slit.

The effect and advantage of the present invention will be described in the following:

In this application, the present invention is used to a flowerpot. With reference to FIGS. 3A and 3B, in FIG. 3A, a flowerpot has a body 1. A plurality of vent holes 2 are formed on a bottom of the body 1. In use, as shown in FIG. 3B, the present invention (comprising the isolating plate 10 and the auxiliary water storage basin 25) is placed in the bottom of the body 1. Thereby, earth can be filled in the isolating plate 10 and plants are planted, then watering the earth. Water wilt flow to the water storage spice W of the auxiliary water storage basin 25 through the vent holes 11 of the isolating plate 10. When water is higher than the ventilating tube 26 of the auxiliary water storage basin 25. Water will flow out from the ventilating tube 26, knowing that water is full.

Figure 3:
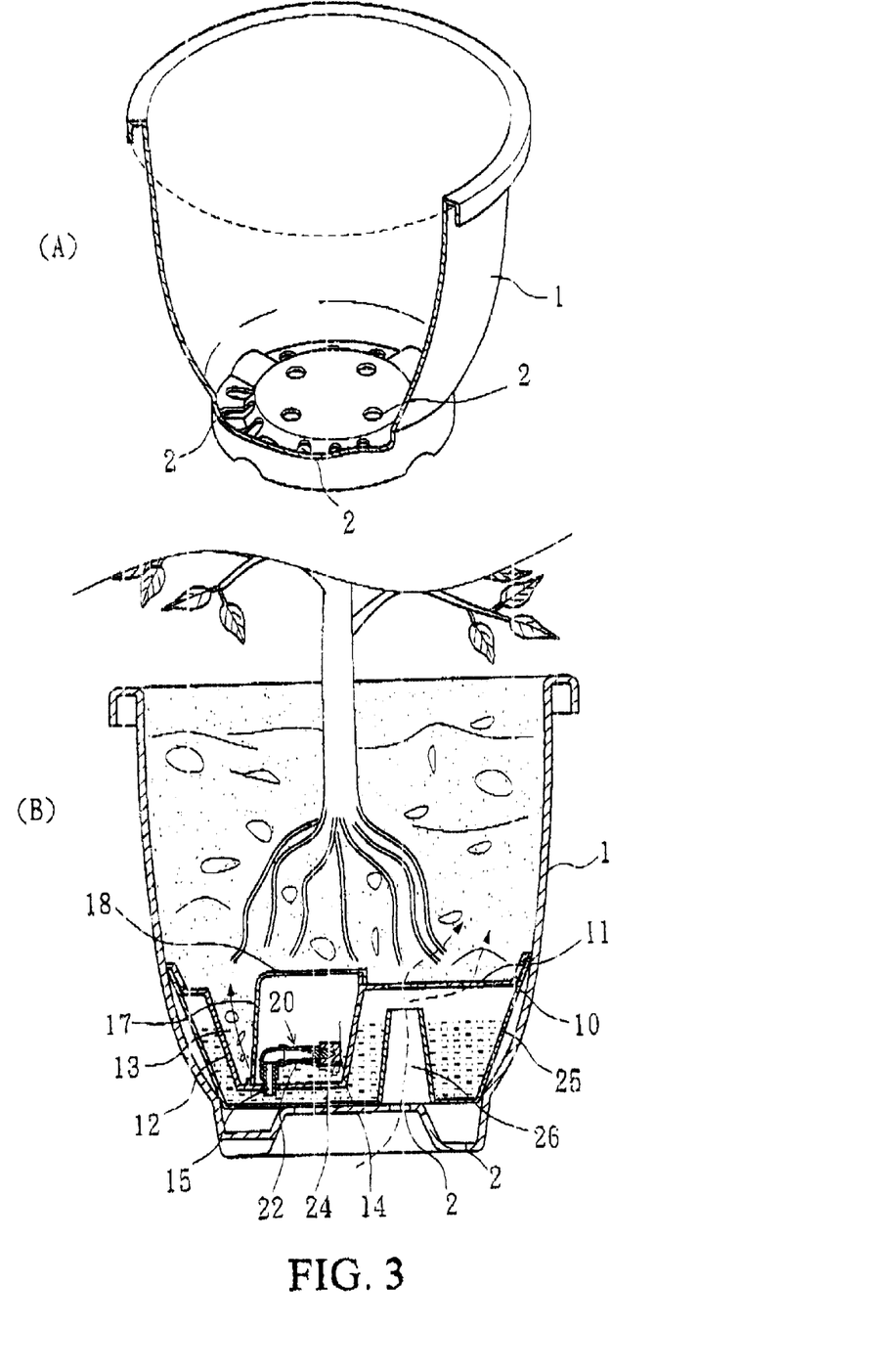
FIG. 3 shows one application of the present invention, wherein in FIG. 3A is a partial cross sectional view of the present invention

In water supply anal control, the planting earth is filled into the water supply groove 13 of the groove seat 12. Water in the auxiliary water storage basin 25 is communicated to the water control chamber 14 of the groove seat 12. The water in the water control chamber 14 is communicated to the water supply groove 13. Thereby, planting earth may absorb water for supplying to plants. The water in the water control chamber 14 will be described herein. Referring to FIG. 3, when in high level (no water is necessary), see FIG. 3A, water will cause that water in the water control chamber 14 rises up so that the soft rubber tube 22 rises up, and thus the slit 23 is compressed and thus is sealed. Thereby, water will not flow into the water control chamber 14 to retain the level of the water control chamber 14. When roots of the plants absorb water, water in the water supply groove 13 and water control chamber 14 are used and thus is descent to a lower level, as shown in FIG. 3B. The floating block 24 descends so that the soft rubber tube 22 bends downwards. Therefore the slit 23 opens. Water in the water storage space W flows into the water control chamber 14 through the water hole 15, soft rubber tube 22, and slit 23. Thereby, it has the effect of supplying water and stopping water. Since the level is limited, amount of water is limited.

Furthermore, it is appreciated that the auxiliary water storage basin 25 of the present invention is formed with a ventilating tube 26. Level set by the ventilating tube 26 is lower than the bottom of the isolating plate 10. The isolating plate 10 has a plurality of vent holes 11. The roots of plants breathe freely. However, this is not seen in the prior art.

Figure 4:
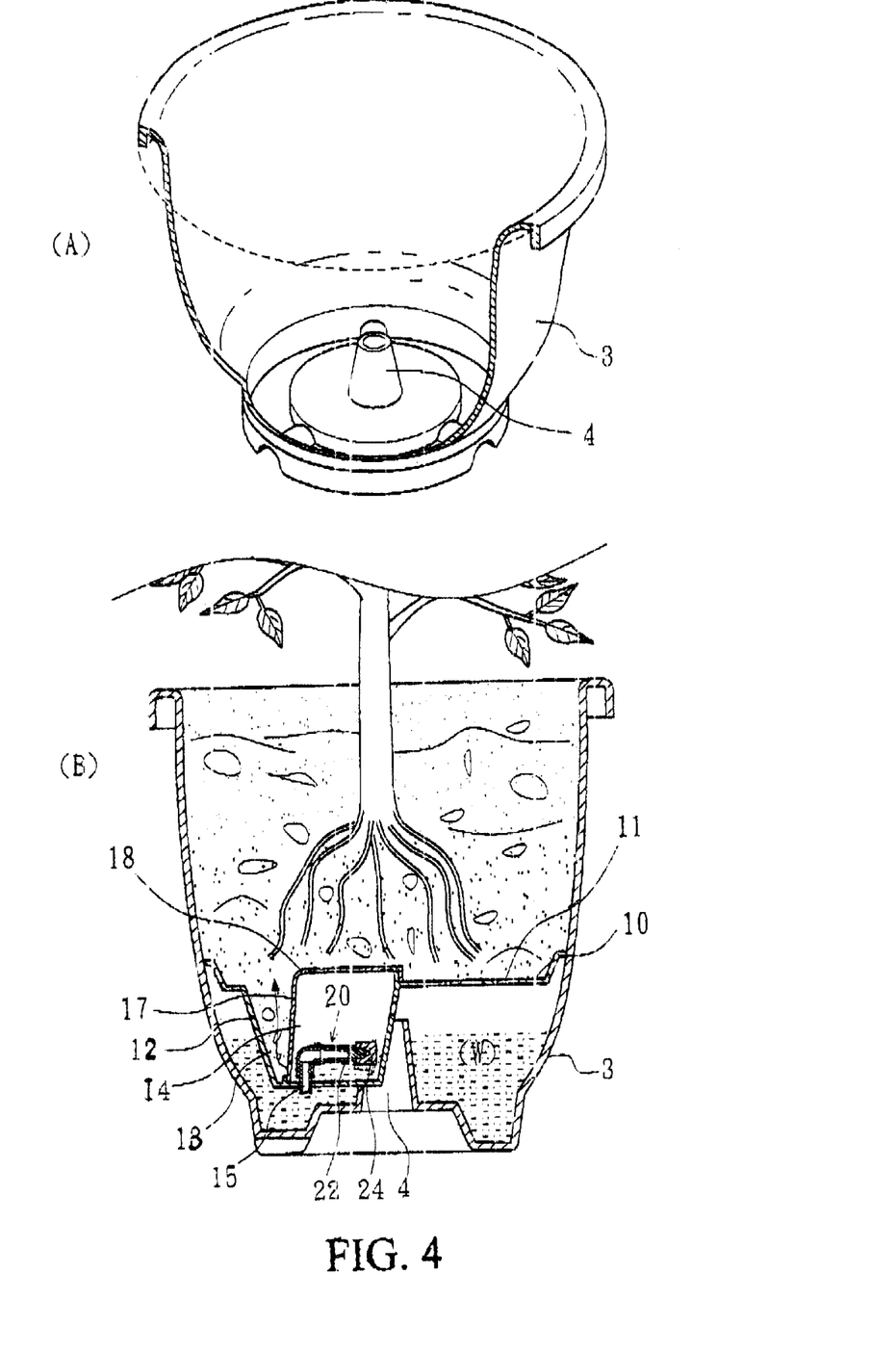

Moreover, another application of the present invention will be described herein with referring to FIGS. 4A and 4B. FIG. 4A shows a flowerpot body 3. A bottom of the body 3 has a ventilating tube 4 having a predetermined height (at this kind of flowerpot, the ventilating tube 4 causes that air can enter into the planting earth). In use, no auxiliary water storage basin 25 is used. It is only necessary that the isolating plate 10 and groove seat 12 are placed in the body 3, as shown in FIG. 4B. A bottom of the body 3 has a ventilating tube 4 having a predetermined height. Thereby, a bottom of the body 3 has a water storage space W. Since in the present invention, the isolating plate 10 spaces the planting earth so that a ventilating space is formed between the bottom of the isolating plate 10 and the surface of water. Therefore, the effects of water filling, stopping and supplying with a preset amount are achieved. Namely, even no auxiliary water storage basin 25, the body 3 is formed with a ventilating tube 4 to use with the isolating plate of the present invention. However, this is within the scope of the present invention.

Moreover, the following embodiment will be described herein.

Figure 5:
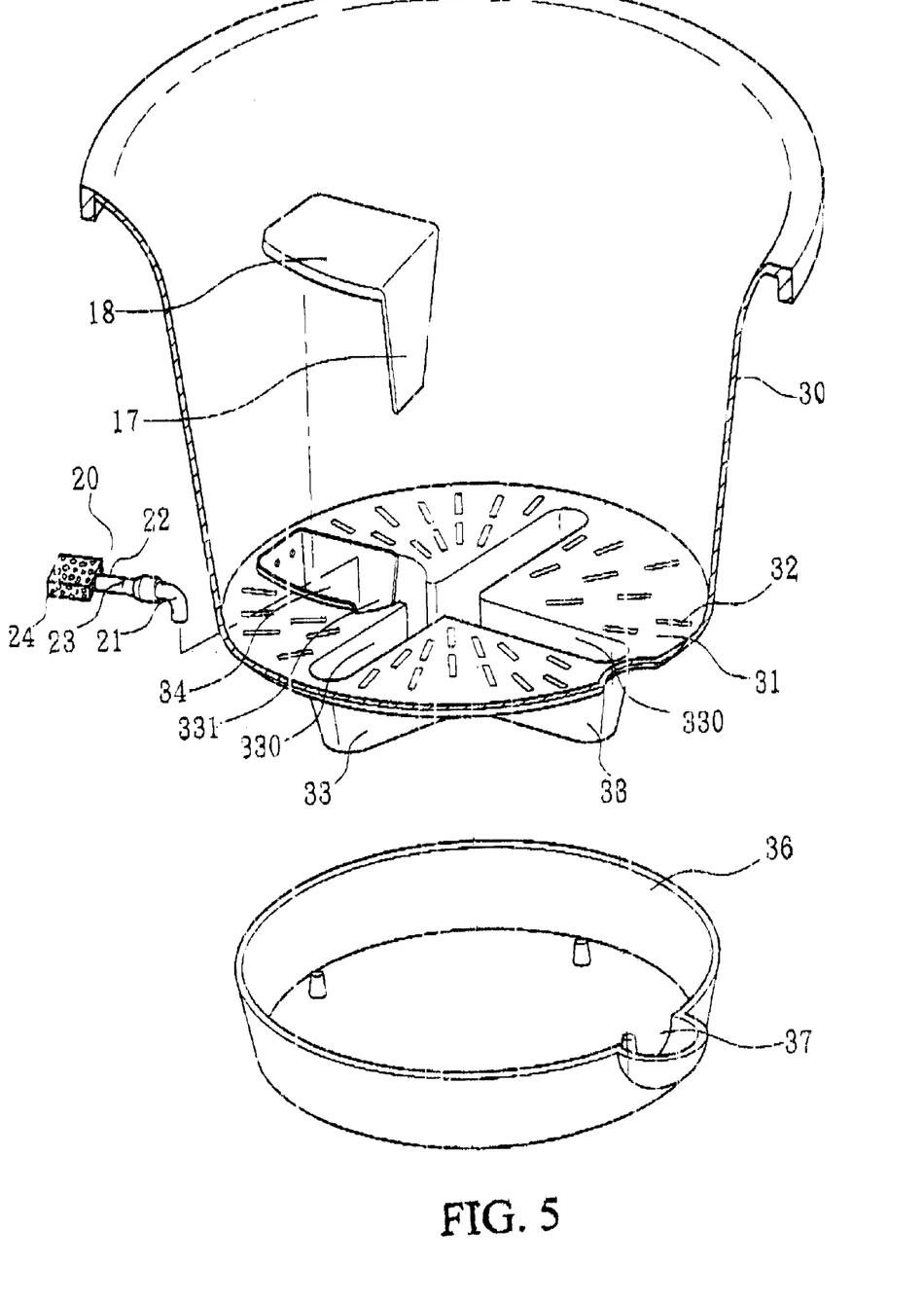
FIG. 5 is an exploded perspective view of the present invention where the isolating plate is integral formed with a flowerpot.
Figure 6:
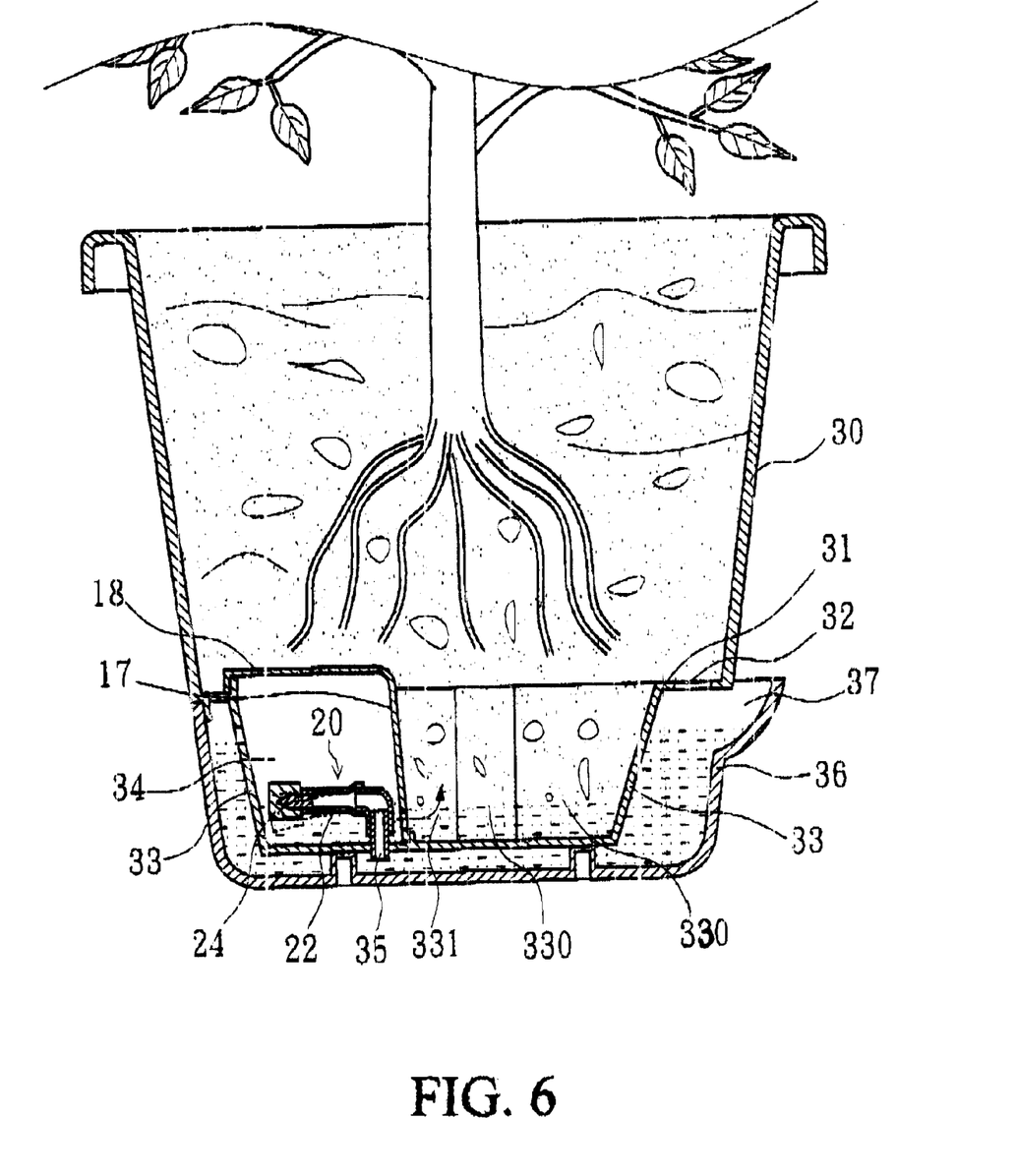
FIG. 6 is an assembled cross sectional view of FIG. 5.

(1) Referring to FIGS. 5 and 6, a bottom of a flowerpot body 30 is installed with a plurality of vent holes 32, groove seat 33, and an isolating plate 10 with groove seat 33. Moreover, a matched water storage tank 26 are installed. The lateral side of the water storage tank 36 has a vent hole 37. The isolating plate 31 has a groove seat 33. A bottom of the groove seat 33 has a water hole 35. The groove seat 33 is spaced by a spacer 17 so as to form a water control chamber 34 and a water supply groove 331. A water control means 20 is placed in the water control chamber 34. The water supply groove 331 is communicated to a groove 330 and planting earth can be placed in the water supply groove 331. The above mentioned structure has the effect of water storage, supply and control. Thereby, it is within the scope of the present invention.

Figure 7:
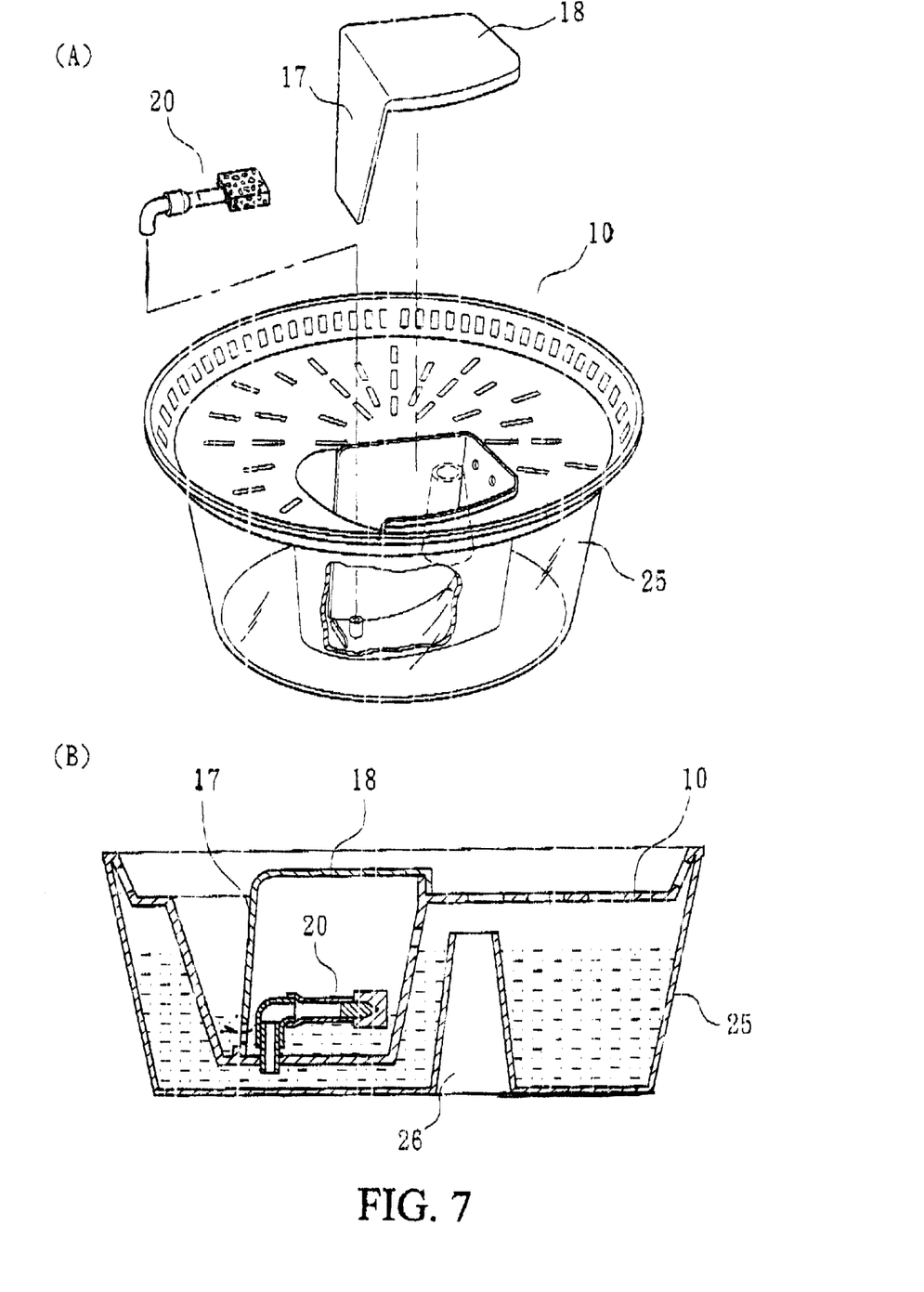

(2) Referring to FIG. 7, the isolating plate 10 and auxiliary water storage basin 25 of FIG. 1 are formed as a integral body (by for example, gluing or shaping by blowing, etc.). Although this can not be used to the structure illustrated in FIG. 4A, it can be used to the flowerpot 1 with flat bottom and vent holes 2 at the bottom thereof.

Figure 8:
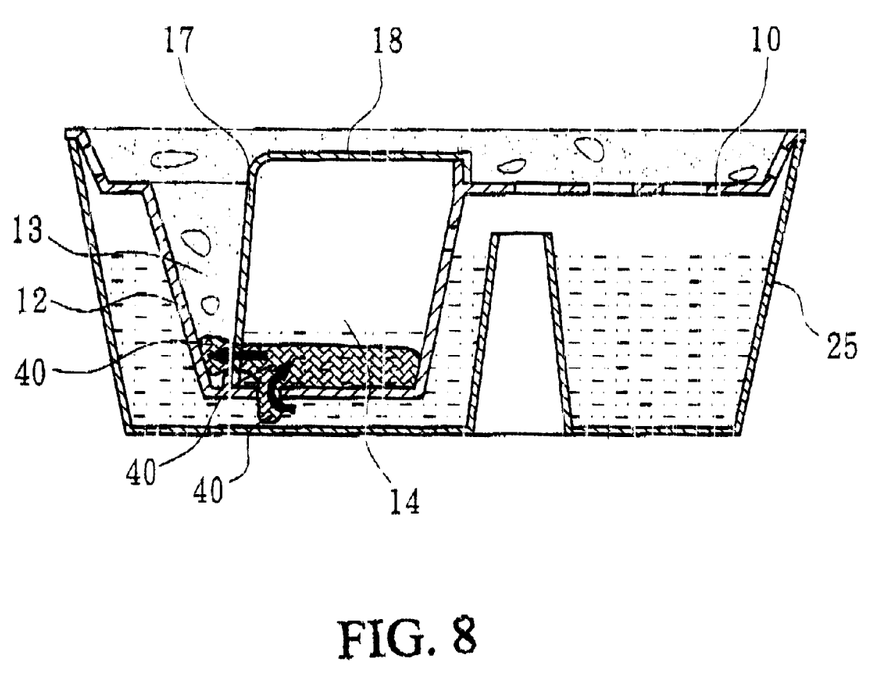
FIG. 8 shows one embodiment that a water absorption material is used in the present invention.

(3) The water control means 40 is made by water absorbing material 40 (such as sponge, cotton layer, foam rubber). Water in the water storage space can be absorbed into the water control chamber 14. Then the planting earth contacts the water absorbing material 40 in the water supply groove 13. When the water absorbing material 40 saturate; no water is absorbed further, while water absorbed in the material is further absorbed by planting earth and thus the saturation is lowered. Moreover, this design has the functions of water storage and supply only the water control means is made by different material (water absorbing material.

The present invention is thus described, it will be obvious that the same may be varied in many ways. Such variations are not to be regarded as a departure from the spirit and scope of the present invention, and all such modifications as would be obvious to one skilled in the art are intended to be included within the; scope of the following claims.

What is claimed is:

1. An isolating plate for a flowerpot for storing water and supplying water with predetermined amount, comprising: an isolating plate with vent holes, an auxiliary water storage chamber, and a water control chamber; wherein the isolating plate has a downward groove seat; the groove seat is installed with a spacer having a cover; the spacer spaces the groove seat into a water control chamber and a water supply groove; the spacer is not tightly sealed so that water in the water control chamber drains into the water supply groove; the cover above the spacer seals the opening at an upper end of the water control chamber of the groove seat; thereby, the planting earth will not drop into the water control chamber; the opening at an upper end of the water supply groove is not sealed so that the planting earth fills into the groove to absorb water in the groove; moreover, a lower end of the water control chamber has a water hole; a lower end of the water hole is communicated to a water storage space below the isolating plate; an upper end of the water hole is assembled with a water control means so that water in the water storage space flows into the water control chamber; moreover, the water level is controlled in a proper value by the water control means so that the water level in the water supply groove is controllable within a predetermined value;

an auxiliary water storage chamber has the water storage space; a ventilating tube is installed in the auxiliary water storage chamber at a place not to communicate with the groove seat of the isolating plate; an upper end of the ventilating tube is lower than a bottom of the isolating plate and has a gap to the bottom of the isolating plate so that water will not contact the isolating plate; thereby, air flows into the space below the bottom of the isolating plate through the ventilating tube.

2. The isolating plate for a flowerpot for storing water and supplying water with predetermined amount as claimed in claim 1, wherein the auxiliary water storage chamber is formed by an auxiliary water storage basin below the isolating plate; isolating plate and the auxiliary water storage basin are placed in the flowerpot; a bottom of the flowerpot has vent holes and thus can not store water, but by the isolating plate and the auxiliary water storage basin, water is stored in the auxiliary water storage basin; amount of water is controlled according to absorption of roots of plants in the flowerpot, moreover, a preferred ventilation is provided.

3. The isolating plate for a flowerpot for storing water and supplying water with predetermined amount as claimed in claim 1, wherein the auxiliary water storage chamber is formed by a space between the isolating plate and a bottom of the flowerpot; the flowerpot has a ventilating tube protruded from a bottom of the flowerpot, the isolating plate is placed in the flowerpot, a space with the flowerpot and below an upper end of the ventilating tube is formed as the water storage space, by the structure of the isolating plate, water in the flowerpot is controllable.

4. The isolating plate for a flowerpot for storing water and supplying water with predetermined amount as claimed in claim 1, wherein the water control means is installed with a soft rubber tube a distal end of the soft tube has a floating block; a slit is formed on the soft rubber tube; a front end of the soft rubber tube has a joint; thereby, when the water control chamber is in high level; the floating block will rise so that the slit is compressed and thus is sealed; thereby, water is stopped; when the water in the water control chamber is in lower level, the floating block descends, and thus the slit opens so that water flow into the slit.

5. The isolating plate for a flowerpot for storing water and supplying water with predetermined amount as claimed in claim 1, wherein the water control means is made of material selected from one of cotton pieces, sponges, foams, which are filled in the water control chamber with a height being the level of water to be supplied; thereby, water in the water storage space is absorbed and then transferred to earth for planting.

6. The isolating plate for a flowerpot for storing water and supplying water with predetermined amount as claimed in claim 2, wherein the isolating plate is integrally formed with the auxiliary water storage basin.

* * * * *